United States Patent

[11] 3,547,379

| [72] | Inventors | Peter G. Kappus;<br>William H. Long, Cincinnati, Ohio |
|---|---|---|
| [21] | Appl. No. | 668,436 |
| [22] | Filed | Sept. 18, 1967 |
| [45] | Patented | Dec. 15, 1970 |
| [73] | Assignee | General Electric Company<br>a corporation of New York |

[54] AIRCRAFT NUCLEAR PROPULSION SYSTEM HAVING AN ALTERNATIVE POWER SOURCE
8 Claims, 3 Drawing Figs.

[52] U.S. Cl. ............................................... 244/55,
60/59, 60/203, 176/52
[51] Int. Cl. ...................................................... B64d 27/22
[50] Field of Search .......................................... 244/53, 55,
58, 62, 73, 15; 60/203, 226, 244, 36, 39.19, 39.18,
59, 224; 176/52, 60

[56] References Cited
UNITED STATES PATENTS
2,604,277  7/1952  Anxionnaz et al. ............  244/15

| 3,068,647 | 12/1962 | Santamaria et al. .......... | 244/55 |
|---|---|---|---|
| 3,229,933 | 1/1966 | Kutney ......................... | 244/55 |
| 3,235,205 | 2/1966 | Newcomb ..................... | 244/54 |
| 3,368,352 | 2/1968 | Hewson ........................ | 60/224 |

FOREIGN PATENTS
1,178,646  12/1958  France ..........................  60/226

Primary Examiner—Milton Buchler
Assistant Examiner—James E. Pittenger
Attorneys—Frank L. Neuhauser, Oscar B. Waddell, Loren W. Peters and Derek P. Lawrence ABSTRACT: An aircraft propulsion system includes a fuselage mounted, primary gas generator powered by nuclear energy for supplying motive fluid to wing mounted propulsion units capable of converting the energy of the motive fluid into useful thrust, the propulsion system also including secondary gas generators mounted on the wings for supplying hot products of combustion to the propulsion units as an alternative or additional motive fluid.

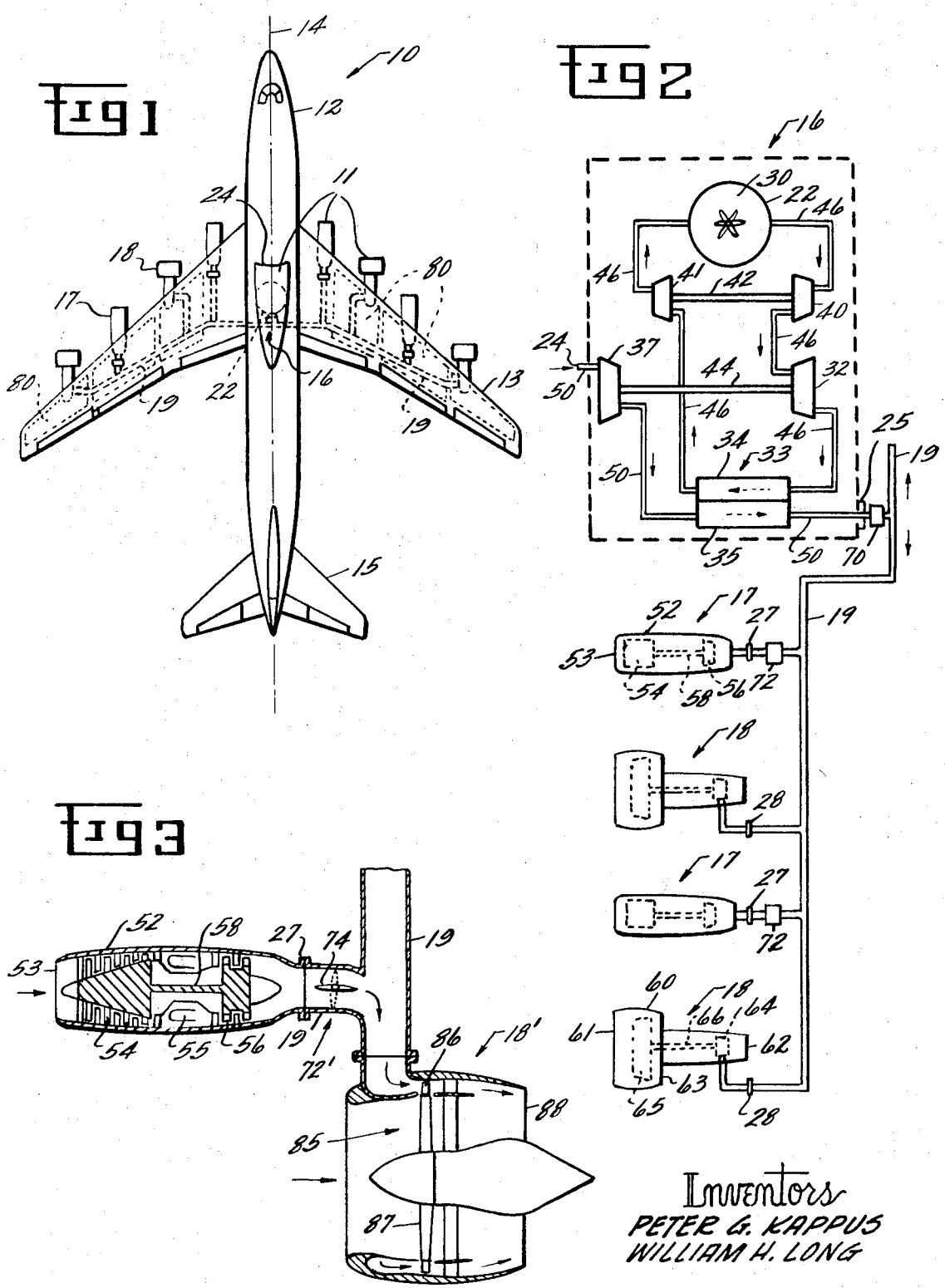

AIRCRAFT NUCLEAR PROPULSION SYSTEM HAVING AN ALTERNATIVE POWER SOURCE

This invention relates to a nuclear power plant for aircraft propulsion and, more particularly, to a nuclear propulsion system having an alternative power source. Still more particularly, this invention relates to a nuclear propulsion system in which a substantial portion of the weight of the system, including the weight of the auxiliary power source, is spread across the wing span of the aircraft to permit the use of high aspect ratio wings.

The present invention is related to copending application Ser. No. 668,581, entitled "Nuclear Propulsion System," filed concurrently herewith on Sept. 18, 1967, now U.S. Pat. No. 3,547,380, issued Dec. 15, 1970, in the names of Peter G. Kappus and William H. Long and assigned to the assignee of this invention, the present invention preferably utilizing the novel nuclear cycle disclosed and claimed by the copending application.

While nuclear power plants have been extensively used in the past for stationary power generation and ship propulsion, various considerations have effectively ruled out the use of conventional nuclear power plants for aircraft propulsion. A primary contributing factor to this situation is, of course, the bulk and weight of conventional nuclear power plants and the accompanying low thrust-to-weight ratios of propulsion systems utilizing such power plants. This limitation has been largely overcome by the highly efficient nuclear cycle taught by the above-identified copending application, the system taught therein making possible relatively high thrust in combination with low weight and high cycle and propulsive efficiencies. However, in order to obtain a reasonable thrust-to-weight ratio, the propulsion system taught by the copending application utilizes a single nuclear reactor since the use of multiple reactors would unduly increase weight. For certain applications such as commercial flights, this type of propulsion system might be considered to be inadequate since a serious failure in the single reactor or its closely related equipment could leave the aircraft without power. In addition, for safety reasons, objections have been raised with respect to the use of nuclear power for aircraft propulsion in populous regions. For example, the use of nuclear power for flights into and out of municipal airports has been objected to on the grounds that fission products may be released during normal power plant operation, in case of damage to the nuclear fuel elements, or in the event of a crash of the aircraft.

When working on a nuclear power plant, great care must be taken to avoid harmful radiation. This means in the case of nuclear power systems for aircraft propulsion that the nuclear reactor and its associated equipment cannot be disassembled and repaired or maintained on the flight line. Instead, such components must be disassembled and worked on only in facilities specially designed to permit such work with a high degree of protection from radiation. Such facilities are commonly known as "hot shop" facilities. In the past, it has been considered necessary to remove an entire nuclear powered aircraft to a hot shop in order to permit any repairs or maintenance, however routing, on its nuclear power plant. This has, of course, substantially restricted the utilization and cost effectiveness of such aircraft relative to aircraft powered by gas turbine engines, the engines of which can be easily removed and replaced or otherwise maintained on the flight line.

Furthermore, the actual operational suitability of an aircraft propulsion system depends, to a large extent, on its installed drag and its ability to fit within a lightweight and aerodynamically well-shaped aircraft. Modern subsonic aircraft using conventional gas turbine engine power plants gain considerable advantage from the mounting of low drag engine nacelles and fuel tanks on the wings since this arrangement spreads both engine and fuel weight over the spans of the aircraft wings. Among other advantages, this mounting arrangement provides relief loads for wing bending moments and permits the use of wings having long spans relative to chord length (high aspect ratio). Unfortunately, a shielded nuclear reactor, which has a weight equivalent to that of a typical fuel load in a conventional aircraft, cannot be spread over the wing span. A shielded nuclear reactor thus constitutes a very heavy concentrated mass which must be located on the aircraft centerline (overall power plant weight would go up significantly if the reactor were split into two units for wing mounting). To avoid leakage of the high temperature and high temperature and high pressure medium heated in the nuclear reactor and to maintain minimum weight, it is also desirable, if not necessary, to install associated energy transfer equipment with the fuselage or otherwise close to the reactor and the aircraft centerline. In view of the above considerations, it is highly desirable that a nuclear power plant used for subsonic aircraft propulsion have its weight spread across the wing span in order to achieve the advantage of high aspect ratio wings.

It is therefore an object of the present invention to provide an improved and practical nuclear propulsion system having an alternative or backup power source for use in place of or in conjunction with the nuclear power source.

Another object of this invention is to provide for a nuclear propulsion system an alternative power source capable of independently providing required power for operation in populous regions or in the event of failure in the nuclear power source.

Still another object of this invention is to provide an aircraft nuclear propulsion system in which the nuclear portion of the propulsive system can be maintained without removing the entire aircraft to a hot shop facility.

Yet another object is to provide a nuclear power plant for aircraft propulsion in which down time for repairs and maintenance is minimized.

A further object is to provide an aircraft nuclear power plant in which the nuclear power source and the alternative power source can be independently removed and replaced.

A still further object is to provide the foregoing objects with a nuclear propulsion system in which a substantial portion of the power plant weight is spread across high aspect ratio wings.

Briefly stated, in carrying out the invention in one form, an aircraft nuclear propulsion system includes a primary nuclear-powered gas generator mounted on the longitudinal axis of the aircraft for producing high energy motive fluid and at least two secondary gas generators symmetrically mounted on the aircraft for independently producing high energy motive fluid. Suitable conduit means interconnect the primary and secondary gas generators and at least two propulsion units symmetrically mounted on the aircraft for selectively supplying motive fluid from either or both of the primary and secondary gas generators to the propulsion units, which are capable of converting energy in the motive fluid into useful thrust for propelling the aircraft. By connecting the conduit means to the gas generators and the propulsion units with detachable couplings, the various components, including the nuclear powered primary gas generator, can be individually removed and replaced. To permit the use of high aspect ratio wings, the secondary gas generators and the propulsion units are distributed across the wing span of the aircraft to substantially spread the weight of the propulsion system and thereby provide relief loads for wing bending moments. By a further aspect of the invention, the secondary gas generators are gas turbine engines of the turbojet type and the propulsion units are bypass fans in which the motive fluid drives turbomachinery for accelerating atmospheric bypass air.

By a still further aspect of the invention, the primary gas generator includes a nuclear reactor for heating a working fluid, preferably an inert gas such as helium, and conduit means for directing the heated working fluid sequentially through a power turbine and a heat exhanger before it is returned to the reactor. The power turbine is driven by the working fluid and, in turn, drives a compressor for compressing atmospheric air. The compressed air is then directed through the heat exchanger where its energy is increased still further, after which the air is discharged to the conduit means as the high energy motive fluid. To achieve suitable efficiency levels, the heat exchanger operates at the maximum possible temperatures permitted by state-of-the-art materials used for heat exchanger construction.

While the novel features of the invention are set forth with particularity in the appended claims, the invention, both as to organization and content, will be better appreciated, along with the other objects and features thereof, from the following detailed description when taken in conjunction with the drawing, in which:

FIG. 1 is a plan view of an aircraft powered by a nuclear propulsion system of this invention, the system including remotely mounted secondary gas generators and propulsion units mounted on the aircraft wings;

FIG. 2 is a schematic view of the power plant of FIG. 1, the fuselage mounted components being enclosed by a heavy broken line; and FIG. 3 is a view of an alternative propulsion unit, the view also including a detailed illustration of a secondary gas generator and a suitable valve means for controlling flow of motive fluid therefrom to the propulsion units.

Turning attention to FIG. 1, an aircraft 10 powered by a nuclear propulsion power plant 11 of this invention is illustrated, the aircraft 10 being designed for subsonic flight and including a fuselage 12, a pair of wings 13 projecting laterally from the fuselage 12 and the longitudinal axis 14 of the aircraft, and a tail assembly 15. The propulsion system includes a centrally disposed primary gas generator 16 located within the fuselage 12 on the axis 14, a plurality of secondary gas generators 17 symmetrically mounted on the wings and a plurality of propulsion units 18 symmetrically mounted on the wings 13, the primary gas generator 16, the secondary gas generators 17, and the propulsion units 18 being interconnected by ducts 19 in the wings 13. This particular arrangement of power plant components results in the spreading of a substantial portion of the overall power plant weight across the wing span, thus permitting the use of relatively high aspect ratio wings (aspect ratio being the ratio of wing span to chord). In addition, this particular arrangement permits the independent removal and replacement of the various components for maintenance purposes.

Referring now to FIGS. 1 and 2, the nuclear propulsion system 11 will be described in greater detail. The primary gas generator 16, which includes nuclear reactor apparatus 22, inducts atmospheric air through an inlet 24, increases the energy of the air, and delivers the energized air to the ducts 19 as a high energy motive fluid. In FIG. 2, the primary gas generator 16, which is thus really a hot air generator in the embodiment described herein, is enclosed by a heavy broken line for the purpose of illustrating that the primary gas generator is an entirely self-contained unit which inducts atmospheric air through the inlet 24 and discharges energized air to the ducts 19. By providing a detachable coupling 25, which may conveniently be a bolted flange coupling, the entire primary gas generator 16 may be disconnected from the remainder of the propulsion system 11 for removal from the aircraft 10. Such removal can, of course, be fully accomplished without disconnecting in any way the reactor circuit or removing the reactor shielding. Similarly, the secondary gas generators 17 and the propulsion units 18 are detachably secured to the ducts 19 by couplings 27 and 28, respectively, for permitting independent installation and removal of the components.

The primary gas generator 16 utilizes the highly efficient nuclear cycle taught by the above-identified copending patent application. More particularly, the primary gas generator 16 includes a single nuclear reactor apparatus 22 located within the fuselage 12 on the longitudinal axis 14, the nuclear reactor 22 including a core 30 through which an inert gas such as helium is continuously circulated during power plant operation. By using an inert gas as the medium circulated through the core 30, it is only necessary to shield the reactor itself and not the ancillary equipment also forming a part of the primary gas generator 16. This ancillary equipment includes the components enclosed by the heavy broken line of FIG. 2, these including a primary power turbine 32, a heat exchanger 33 having first and second sets of heat exchange passages 34 and 35, respectively, arranged in counterflow relationship, a primary compressor 37, the air inlet 24 communicating with the atmosphere, an accessory turbine 40, and an accessory compressor 41. The accessory turbine 40 and the accessory compressor 41 are connected by a shaft 42 so that the compressor 41 may be driven by the turbine 40, and the primary power turbine 32 and the primary compressor 37 are connected by a shaft 44 so that the compressor 37 may be driven by the turbine 32. Closed conduit means 46 formed by ducts or other suitable structure forms a closed loop interconnecting the reactor core 30, the accessory turbine 40, the primary power turbine 32, the first set of heat exchange passages 34, the accessory compressor 41, and the reactor core 30 for continuous flow of the inert gas therethrough in the direction indicated by the arrows. During power plant operation, the inert gas is heated to high temperature and high pressure conditions in the reactor core 30 and is then supplied to the accessory turbine 40 and the main power turbine 32 where a portion of its energy is extracted mechanically. After passing through the primary power turbine 32, the inert gas passes through the heat exchanger 33 where additional energy is extracted thermally and the accessory compressor 41 where sufficient energy is returned to the gas to return it to the reactor 22. The accessory turbine 40 and the accessory compressor 41 are thus simply a pumping mechanism for the inert gas and, as such, are quite small and do not represent any substantial input or output of energy. On the other hand, it will soon become obvious that large amounts of energy are removed from the inert gas in mechanical and thermal form by the primary power turbine 32 and the heat exchanger 33.

The primary gas generator 16 also includes open conduit means 50 formed of ducts or similar structure interconnecting the inlet 24, the primary compressor 37, the second set of heat exchange passages 35, and the ducts 19 leading to the multiple propulsion units 18. During power plant operation, atmospheric air is, as indicated above, inducted through the inlet 24 and then compressed to high pressure by the compressor 37, after which its energy is increased still further by heat transferred to it in the heat exchanger 33. The energized air discharged from the heat exchanger 33 is then supplied to the ducts 19 as high energy motive fluid for delivery to the propulsion units 18.

The particular arrangement of components just described permits the primary gas generator 16 to operate in an extremely efficient manner. As a result, the components can be relatively small and lightweight. By way of explanation, it is pointed out that common materials used in the construction of heat exchangers such as the heat exchanger 33 are unable to operate for prolonged periods at temperatures much above 1,500° F. because of the oxidizing atmosphere present therein during power plant operation. Accordingly, the temperature of the air leaving the heat exchanger 33 is limited by the temperature capabilities of the materials of the heat exchanger 33. In the arrangement described herein, this air can be used at its maximum energy level for providing propulsive thrust since the turbine 32 and the compressor 37 are not driven by the energized air. If such were the case, the air could no longer be used at its maximum energy level for propulsion. To obtain sufficient power output from such reduced energy air, it would be necessary to increase the total air flow and inert gas flow and, consequently, the size and weight of all components. In addition, the turbine 32 would be much less efficient, and would have to be still larger and heavier, than in the arrangement of this invention since it would be operating at sharply reduced temperature and pressure levels.

The secondary gas generators 17 are gas turbine engines of the turbojet type, each engine including an aerodynamically streamlined nacelle 52 having an inlet 53 through which atmospheric air may be inducted for supporting combustion. As best shown by FIG. 3, the nacelle 52 surrounds an axial flow compressor 54 which receives air from the inlet 53 and compresses the air to a high pressure for supporting combustion of fuel within a combustion chamber 55. From the combustion apparatus, the high temperature and high pressure products of combustion are supplied to an axial flow turbine 56, which extracts energy from the products of combustion for driving the compressor 54 through a shaft 58. From the turbine 56, the products of combustion are discharged into the ducts 19 for delivery to the propulsion units 18 as high energy motive fluid.

To provide propulsive thrust, high energy motive fluid, which may be either or both energized air from the primary gas generator 16 or hot products of combustion from the secondary gas generator 17, is supplied through the ducts 19 to the propulsion units 18, only two of which are illustrated by FIG. 2. Each propulsion unit 18 includes an aerodynamically streamlined nacelle 60 having an inlet 61 and a pair of outlets 62 and 63. Within the nacelle 60 is a turbine 64 connected to the ducts 19 for receiving motive fluid therefrom and a compressor, or fan 65 driven by the turbine 64 through a shaft 66. During power plant operation, motive fluid supplied by the ducts 19 drives the turbine 64 and the compressor 65, the reduced energy motive fluid then being expanded to atmosphere through the primary nozzle 62 to produce a first thrust component. The energy extracted by the turbine 64 is used to compress air inducted through the inlet 61, the compressed air then being expanded to atmosphere through the secondary nozzle 63 to produce a second thrust component. For subsonic aircraft, this arrangement within the propulsion units 18 provides a high propulsive efficiency since the motive fluid supplied from the primary and secondary gas generators 16 and 17 is not merely discharged as a high velocity jet, but is first used to accelerate additional air through the fan 65. As a result, a much greater mass of propulsion air is discharged at a much lower velocity approaching that of the aircraft 10. For high propulsion efficiency in subsonic aircraft, it is desirable that the mass flow through the fan 65 be substantially greater than that through the turbine 64, preferably at least two or three times as great. In addition, a relatively high mass flow through the fan 65 assures minimum bulk and weight of the ducts 19, the primary turbomachinery of the primary gas generator 16, the secondary gas generators 17, and the power turbine 64 and its nozzle 62.

To control the flow of motive fluid to the propulsion units 18, valves means 70 and 72 associated with each of the primary and secondary gas generators 16 and 17, respectively, are provided in the ducts 19. These valves 70 and 72 have open positions for permitting the flow of motive fluid from the associated gas generator to the propulsion units 18 and closed positions for preventing the flow of motive fluid to the associated gas generator when it is inoperative. Thus, during normal aircraft operation on nuclear power only, the valves 72 associated with the inoperative secondary gas generators 17 will be closed and the valves 70 will be open to permit flow of energized air from the primary gas generator 16 to the propulsion units 17. By closing the valves 72, potentially destructive reverse flow energized air through the compressor 54 and the turbine 56 of the secondary gas generators 17 is prevented. On the other hand, during operation in populous regions or whenever it is desired to operate solely on the alternative, nonnuclear power source, the valve 70 will be closed and the valves 72 will be opened to permit flow of products of combustion from the secondary gas generators 17 to the propulsion units 18. In the event that it is desired to operate with both the primary gas generator 16 and the secondary gas generator 17 simultaneously supplying motive fluid at substantially the same pressure, the valves 70 and 72 may be opened simultaneously. As an example of suitable valve means, attention is directed to FIG. 3 where a simple butterfly valve 72' is illustrated, the valve 72' having a valve plate 74 having an open position illustrated by solid lines and a closed position illustrated by broken lines.

The valve arrangement just described represents a minimum system for assuring proper flow of motive fluid to the propulsion units 18. If desired, more complex valving arrangements could be used within the scope of the present invention. For example, valve means could be arranged such that each secondary gas generator 17 communicates with only a single propulsion unit 18 instead of communicating with all propulsion units as in the illustrated embodiment.

By locating the secondary gas generators 17 and the propulsion units 18 on the wings 13 along with the fuel tanks 80 (see FIG. 1), a substantial portion of the overall power plant weight is spread across the wings 13, thereby providing relief loads for wing bending moments and permitting higher wing aspect ratios than would otherwise be possible.

Various alternative arrangements will, of course, occur to those copending in the art. For example, the propulsion units could take the form illustrated by FIG. 3, the units 18' utilizing tip turbine fans 85 in which the propulsion unit compressor and turbine are combined into a single entity with turbine buckets 86 mounted on the tips of the compressor blades 87. In such an arrangement, the air flowing through the blades 87 is mixed with the motive fluid flowing through the buckets 86, the mixed stream being discharged through a single nozzle 88. Furthermore, while it is highly desirable that the primary gas generator 16 take the form taught herein and in the aforesaid copending patent application because of the many advantages of such an arrangement, including light weight and high cycle efficiency, it will occur to those skilled in the art that many of the additional advantages of the present invention, including auxiliary power capability, easy removal and replacement of nuclear components outside of a hot shop facility, and ideal weight distribution, can be obtained in large measure with state-of-the-art nuclear powered gas generators. In addition, it will be obvious that under changed circumstances, the primary gas generator could be used to increase the energy level of a motive gas other than air.

In the foregoing description, it has been pointed out that the detachable couplings 25, 27 and 28 permit easy removal and replacement of the primary and secondary gas generators 16 and 17, respectively, on the flight line. In particular, the compact and self-contained packaging of the primary gas generator 16 permits its removal and replacement outside of a hot shop facility without risk of radiation injury. It will now occur to those skilled in the art that the aircraft 10 can be operated with one or more of the gas generators 16 and 17 removed and the appropriate valves 70 and 72 closed. Thus, with the nuclear gas generator 16 removed and the valve 70 closed, the aircraft 10 can be operated on chemical power alone. Thus, the aircraft 10 could be used if desired as a short-to-medium range transport with high payloads or as a nonnuclear transport in regions where the use of nuclear power may be restricted for some reason. Similarly, the aircraft could be extensively flight tested with chemical power plant means only without waiting for the delivery of the primary gas generator, and proficiency training, etc., could be carried on if desired without the nuclear-powered gas generator. On the other hand, under other circumstances, it may be desirable to utilize the nuclear power capability without carrying a backup power source. In such a case, the secondary gas generators 17 could be removed and the valves 72 closed.

From the foregoing, it will be appreciated that the aircraft nuclear propulsion system of this invention provides an effective arrangement for providing an alternative power source for use in addition to or in conjunction with the nuclear power source. Furthermore, the arrangement of this invention simplified maintenance and provides substantial wing relief loading so as to permit the use of high aspect ratio wings.

It will be understood that the invention is not limited to the specific details of the construction and arrangement of the particular embodiments illustrated or otherwise described herein. It is therefore intended to cover in the appended claims all such changes and modifications which may occur to those skilled in the art without departing from the true spirit and scope of the invention.

We claim:

1. In an aircraft including a fuselage disposed coaxially with the longitudinal axis of the aircraft and wings projecting laterally from the fuselage and the longitudinal axis of the aircraft, a propulsion system comprising:

A. a primary gas generator mounted on the longitudinal axis of the aircraft for producing high energy motive fluid, said primary gas generator comprising:
  a nuclear reactor apparatus including a reactor core and a cooling medium therefor,
  a primary power turbine,
  a heat exchanger including first and second passage means disposed in heat exchange relation,
  closed conduit means serially interconnecting said nuclear reactor apparatus, said power turbine, said first passage means of said heat exchanger, and said nuclear reactor apparatus such that said cooling medium may be sequentially directed through said power turbine and said heat exchanger and then returned to said nuclear reactor apparatus.
  means for circulating said cooling medium through said closed conduit means,
  inlet means communicating with the atmosphere,
  a primary compressor,
  means interconnecting said power turbine and said compressor for driving said compressor from said power turbine,
  and open conduit means serially interconnecting said primary inlet means, said compressor, and said second passage means of said heat exchanger, such that atmospheric air inducted through said primary inlet means is sequentially directed through said compressor and said heat exchanger to increase its energy level and then discharged through discharge means from said primary gas generator as high energy motive fluid, B. at least two secondary gas generators symmetrically mounted on opposite sides of the longitudinal axis of the aircraft for producing high energy motive fluid, each secondary gas generator including in series relation inlet means communicating with the atmosphere, a compressor, combustion apparatus communicating with said compressor, a turbine communicating with said combustion apparatus, drive means drivingly interconnecting said turbine and said compressor, and a discharge conduit communicating with said turbine to discharge hot gases transmitted therefrom as high energy motive fluid;

C. at least two propulsion units symmetrically mounted on opposite sides of the longitudinal axis of the aircraft, each said propulsion unit comprising;
  a turbine,
  first outlet means communicating with said turbine for receiving motive fluid therefrom and for discharging the motive fluid to the atmosphere to produce a first component of thrust,
  inlet means communicating with the atmosphere,
  a compressor communicating with said inlet means,
  drive means drivingly interconnecting said turbine and said compressor, and
  second outlet means communicating with said compressor for receiving compressed air therefrom to produce a second component of thrust, D. and conduit means interconnecting the discharge means of said primary gas generator and each said secondary gas generator in parallel relation, interconnecting the turbines of each said propulsion unit in parallel relation with the other propulsion unit turbines, and interconnecting in series relation the parallel connected discharge means and the parallel connected propulsion unit turbines.

2. A propulsion system as defined by claim 1 in which the medium heated by said nuclear reactor apparatus is an inert gas directed by said closed conduit means through the core of the nuclear reactor apparatus, said propulsion system further comprising:
  an accessory turbine connected to said closed conduit means upstream of said heat exchanger and an accessory compressor connected to said closed conduit means downstream of said heat exchanger; and
  means interconnecting said accessory turbine and said accessory compressor for driving said accessory compressor from said accessory turbine so as to thereby circulate the inert gas through said closed conduit means.

3. A propulsion system as defined by claim 2 in which said secondary gas generators and said propulsion units are disposed in aerodynamically streamlined nacelles so as to minimize aerodynamic drag during aircraft operation.

4. A propulsion system as defined by claim 3 in which said primary gas generator, said secondary gas generators, and said propulsion units are each independently mounted on said aircraft, said propulsion system further including detachable coupling means securing said conduit means to each of said components for permitting individual removal and installation of said components.

5. A propulsion system as defined by claim 2 further including valve means in said conduit means for directing motive fluid to said propulsion units from selected ones of said primary and secondary gas generators and for preventing flow of motive fluid from said selected ones to any nonselected ones of said gas generators.

6. A propulsion system as defined by claim 5 in which said valve means comprises a plurality of valve elements each associated with a respective one of said primary and secondary gas generators, each of said valve elements having an open position for permitting flow of motive fluid from the respective gas generator and a closed position for preventing flow of motive fluid to the respective gas generator.

7. A propulsion system as defined by claim 6 in which said propulsion unit turbine and said propulsion unit compressor are spaced apart and said drive means therebetween comprising a shaft, the mass rate of air flow through said propulsion unit compressor being substantially greater than the mass flow of motive fluid flow through said propulsion unit turbine.

8. A propulsion system as defined by claim 6 in which said propulsion unit turbine comprises at least one row of turbine buckets peripherally mounted on at least one row of compressor blades comprising said propulsion unit compressor, said drive means therebetween comprising peripheral support structure interconnecting said compressor blades and said turbine buckets, and said first and second outlet means comprising a single jet nozzle, the mass rate of air flow through said propulsion unit compressor being substantially greater than the mass flow of motive fluid through said propulsion unit turbine.

UNITED STATES PATENT OFFICE
CERTIFICATE OF CORRECTION

Patent No. __3,547,379__  Dated __December 15, 1970__

Inventor(s) __PETER G. KAPPUS and WILLIAM H. LONG__

It is certified that error appears in the above-identified patent and that said Letters Patent are hereby corrected as shown below:

Column 7, line 61 - after the word "therefrom", add -- and for discharging the compressed air therefrom --

Signed and sealed this 27th day of July 1971.

(SEAL)
Attest:

EDWARD M. FLETCHER, JR.
Attesting Officer

WILLIAM E. SCHUYLER, JR.
Commissioner of Patents